INVENTORS
WALTER D. HARRISON
HARRY W. SCHMITZ
LOREN R. GUTE
BY M.H. Strickland
THEIR ATTORNEY

United States Patent Office 2,959,968
Patented Nov. 15, 1960

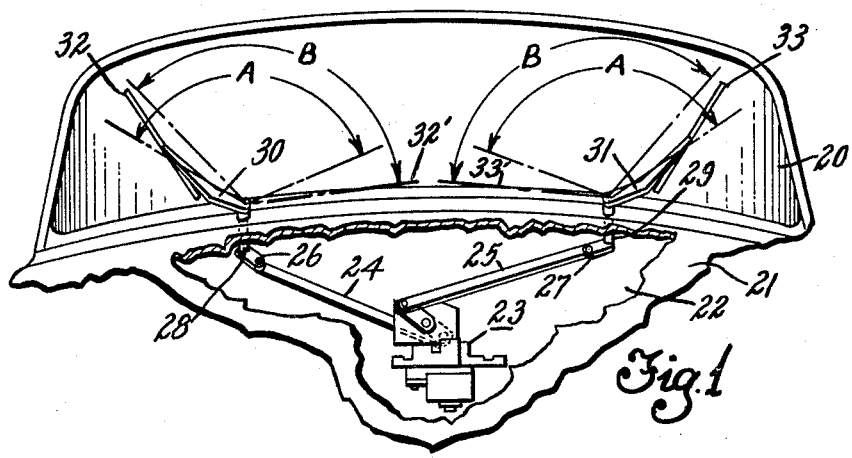
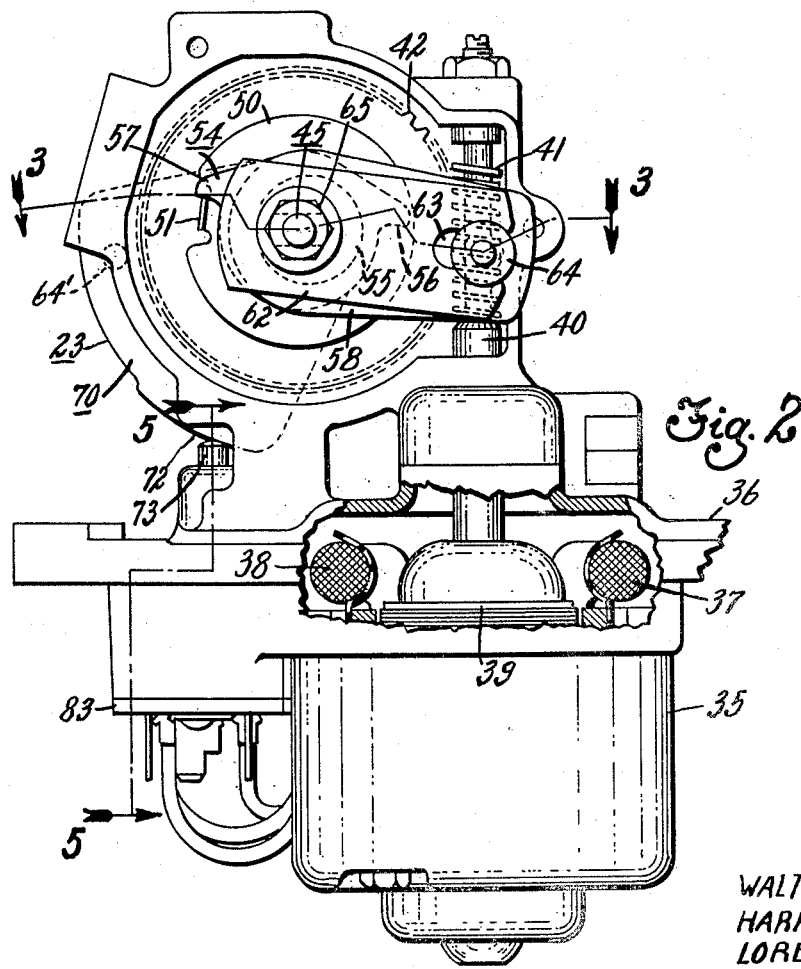

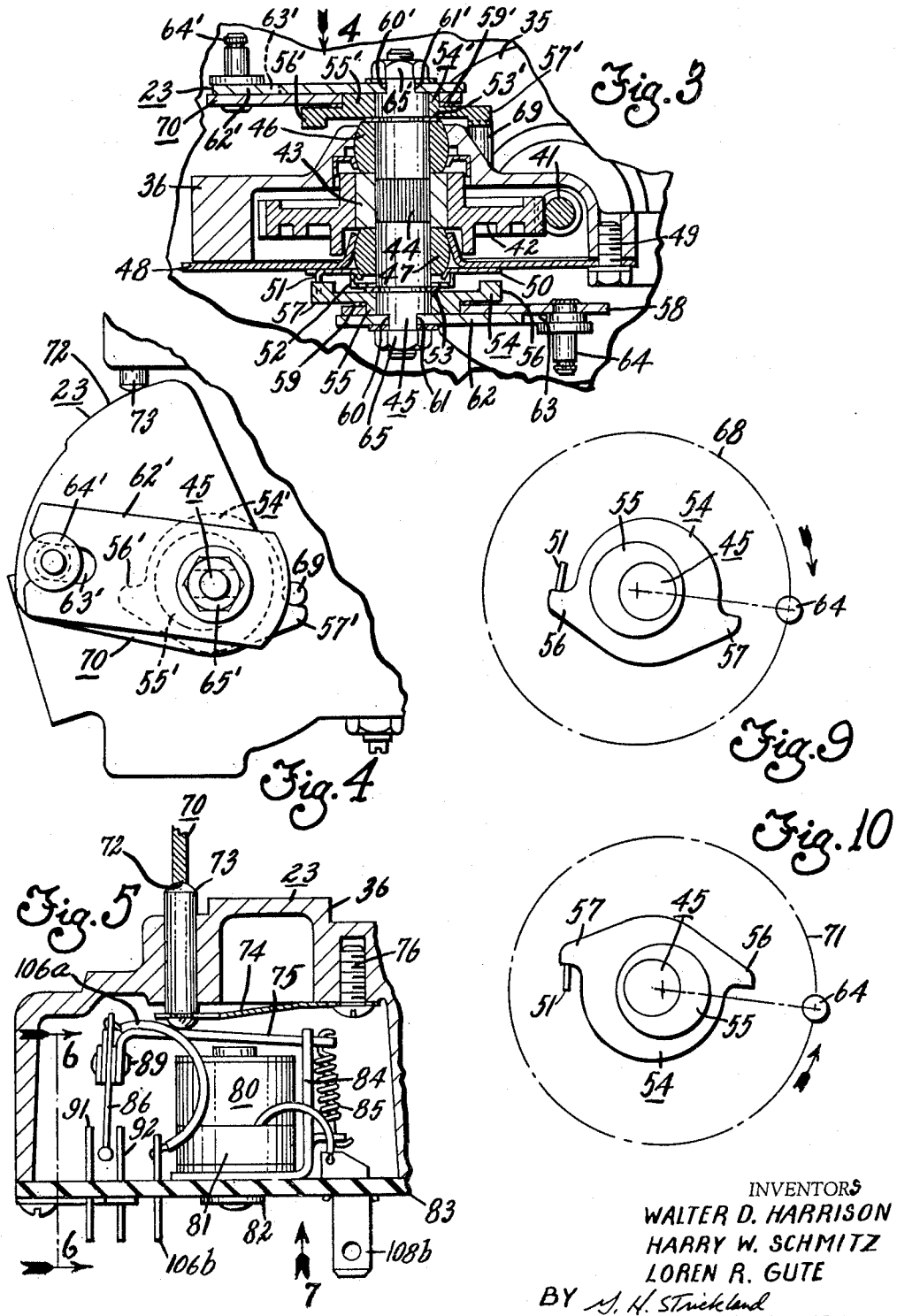

2,959,968
WINDSHIELD WIPER ACTUATING MECHANISM

Loren R. Gute, Fairport, and Walter D. Harrison and Harry W. Schmitz, Rochester, N.Y., assignors to General Motors Corporation, Detroit, Mich., a corporation of Delaware Filed Apr. 18, 1957, Ser. No. 653,665

7 Claims. (Cl. 74—70)

This invention pertains to windshield wipers, and particularly to improved mechanism for windshield wipers.

The desirability of parking wiper blades outside of the normal wiping stroke, preferably against the cowl of a vehicle, is well recognized. Heretofore mechanisms have been devised wherein the throw of a crank is varied to effect movement of the wiper blades in the parked position, the throw of the crank being dependent upon the direction of rotation of a reversible driving member, such as an electric motor. This invention relates to actuating mechanism driven by an electric motor wherein the effective throw of a crank is varied dependent upon the direction of motor rotation by automatically changing the orbit of a crank pin.

Accordingly, among our objects are the provision of windshield wiper actuating mechanism including a rotary driving member for actuating a crank including means for varying the effective throw of a crank; the further provision of a crank assembly for windshield wiper actuating mechanism including eccentric means for varying the orbit of a crank pin; the further provision of windshield wiper actuating mechanism including a reversible rotary driving member for actuating crank means, the effective throw of the crank means being dependent upon the direction of rotation of the driving member; and the still further provision of an improved control system for reversible electric motor driven windshield wiper actuating mechanisms.

The aforementioned and other objects are accomplished in the present invention by rotatably journalling a crank on an eccentric and incorporating means for controlling the position of the eccentric to vary the orbit of a crank pin carried by the crank. Specifically, the actuating mechanism includes a reversible electric motor which is connected through a suitable gear reduction to a shaft. The shaft is rotatably journalled in a housing and opposite ends of the shaft extend without the housing. An eccentric is rotatably journalled on each end of the shaft, each eccentric having a pair of diametrically opposed abutments cooperable with a stationary abutment, or stop, on the housing. A crank arm is rotatably journalled on each eccentric, each crank arm having a crank pin attached thereto at its outer end. The driving connection between the shaft and each crank is constituted by a drive arm, the inner end of which is connected to the shaft and the outer end of which has a slot within which the crank pin is slideably received. A spring washer is interposed between each crank arm and its respective eccentric to prevent movement of the eccentric under crank load. The drive arms also frictionally engage the eccentrics, whereby upon reversal of rotation the eccentric will be shifted.

The two crank arms are angularly spaced slightly less than 180° and operate as bicycle cranks. As shown herein, the crank pins may be connected to the inner ends of links, the outer ends of which are pivotally connected to crank arms attached to spaced wiper actuating shafts. During forward rotation of the motor, one of the abutments on each eccentric is maintained in engagement with its cooperable abutment due to the friction drive connection between each drive arm and crank and its eccentric. Accordingly, the orbit of each crank pin will remain fixed, the crank pin rotating about the center of the eccentric so that the wiper blades have imparted thereto oscillation of a predetermined amplitude. When the direction of rotation of the motor is reversed, the eccentrics are rotated relative to the shaft due to the friction drive between the drive arms and cranks and the eccentrics so that the other abutment on each eccentric engages the stationary stop. When the position of the eccentric is reversed, the orbit of the crank pins with respect to the center of the shaft is changed. The amplitude of oscillation imparted to the wiper blades remains the same, but due to the change in the orbital path of the crank pins, the wiping paths are shifted relative to the windshield so that the blades move into engagement with the cowl of the vehicle at the inner ends of their strokes, at which point the motor is deenergized. Thus, the effective throw of the cranks is greater during reverse rotation of the motor than it is during forward rotation of the motor.

The control system for the reversible electric motor includes a manual switch having park, low and high speed positions, a relay operated reversing switch having an energized position, a deenergized position and an "off" position, and circuits controlled by the switches. When the manual control switch is in either the low or high speed position, the relay switch is energized and circuits are completed for energizing the motor in the forward direction. When the manual control is moved to the "off," or park position, the relay switch is deenergized and completes an energizing circuit for the motor in the reverse direction. One of the crank arms has a cam thereon arranged to mechanically move the relay operated switch to an "off" position when the crank arms, and the wiper blades, arrive at a predetermined position. Thus, the motor is energized for reverse rotation, the effective throw of the cranks is increased, and the motor is automatically deenergized when the wiper blades arrive at the parked position upon movement of the manual control switch to the "off" position.

Further objects and advantages of the present invention will be apparent from the following description, reference being had to the accompanying drawings, wherein a preferred embodiment of the present invention is clearly shown.

In the drawings:

Figure 1 is a fragmentary view with certain parts broken away of a vehicle equipped with the windshield wiper actuating mechanism of this invention.

Figure 2 is a view, partly in section and partly in elevation of windshield wiper actuating mechanism constructed according to this invention.

Figure 3 is a fragmentary view, partly in section and partly in elevation, taken along line 3—3 of Figure 2, Figure 4 is a fragmentary view in elevation taken in the directions of arrow 4 of Figure 3.

Figure 5 is a fragmentary view, partly in section and partly in elevation, with certain parts removed, taken along line 5—5 of Figure 2.

Figure 9 is a diagrammatic view illustrating the orbit of one of the crank pins during forward rotation.

Figure 10 is a view similar to Figure 9 illustrating the orbit of the crank pin in the reverse direction.

Figure 6:
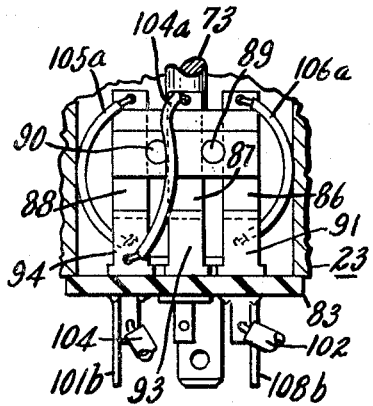
Figure 6 is a fragmentary view, partly in section and partly in elevation, taken along line 6—6 of Figure 5.

With particular reference to Figure 1, a vehicle is shown having a windshield 20, a cowl 21 and a firewall 22. The electric motor driven windshield wiper actuating mechanism of this invention is depicted generally by the numeral 23 in Figure 1 and is suitably attached to the firewall 22. The mechanism 23 is connected by links 24 and 25 to crank arms 26 and 27, respectively, attached to the pivot shafts 28 and 29, respectively, which are rotatably journalled in the cowl portion 21 and extend therethrough. The pivot shafts 28 and 29 have wiper arms 30 and 31, respectively, connected thereto which carry wiper blades 32 and 33, respectively.

With particular reference to Figure 2, the actuating mechanism 23 includes a reversible direct current electric motor 35 having an end cap 36 which constitutes a mounting bracket and a housing for the crank assembly, to be described. The motor 35 has a shunt field winding 37 and a series field winding 38 as well as an armature 39 having a shaft 40. The armature shaft 40 is suitably journalled in the end cap 36, and has a worm 41 formed thereon which engages a worm gear 42.

With particular reference to Figure 3, the worm gear 42 is attached to a bushing 43, the bushing 43 being drivingly connected to a knurled portion 44 of a shaft 45. The shaft 45 extends in opposite directions, one end of the shaft being journalled by a self-aligning bearing 46 in an extension of the motor end cap 36. The other end of the shaft 45 is journalled by a self-aligning bearing 47 carried by a plate 48 attached to the end cap 36 by screws as indicated by numeral 49. The bearing 47 includes an outer retaining member 50 having a tang 51 struck outwardly therefrom, the function of which will be described more particularly hereinafter. The bearing retaining member 50 is secured to the plate 48. An oil slinger 52 is mounted on the shaft 45 and is engaged by a retaining ring 53 disposed in an annular groove in the shaft.

A cam, or eccentric, 54 is rotatably journalled on the lower end of the shaft 45 as shown in Figure 3. The cam 54 includes an axially extending eccentric hub portion 55 and an outwardly extending flange portion having diametrically opposed stop lugs 56 and 57. The crank arm 58 is rotatably journalled on the eccentric hub 55, a spring washer 59 being interposed between the crank arm 58 and the flange portion of the eccentric 54. The lower end of the shaft 45 has a pair of flats 60 and 61 formed thereon which are received in a complementary aperture in a drive arm 62. The drive arm 62 is formed with a slot 63 at its outer end within which a portion of a crank pin 54 attached to the crank arm 58 is disposed. These parts are maintained in assembled relation with the shaft 45 by a nut and washer assembly 65, the nut engaging the integrally threaded portion of the shaft 45.

The upper end of the shaft 45, as shown in Figure 3, likewise has a crank arm assembly attached thereto, similar parts being depicted by similar numerals with primes affixed. Thus, the self-aligning bearing 46 is engaged by a retaining ring 53' situated in a groove in the shaft 45, an eccentric, or cam, 54' being rotatably journalled on the upper end of the shaft. The eccentric 54' includes diametrically opposed stop lugs 56' and 57' and a hub portion 55' upon which a crank arm 70 is rotatably journalled. The crank arm 70 carries a crank pin 64' which is received in a slot 63' of a drive arm 62' having an aperture receiving the flats 60' and 61' on the upper end of the shaft 45. These parts are likewise held in assembled relation with the shaft 45 by a nut and washer assembly 65', and a spring washer 59' is interposed between the crank arm 70 and the flange portion of the eccentric 54'.

The crank arms 58 and 70 are disposed on opposite sides of the worm gear 42 and, as shown, the crank pins 64 and 64' are angularly spaced slightly less than 180°, as shown in Figure 2. This particular spacing applies to the mechanism designed for a particular installation and may be voided in other installations. The crank arms operate like bicycle cranks with crank pin 64 being attached to one of the links 24 or 25, and crank pin 64' being attached to the other of the links.

With particular reference to Figure 2, the eccentric 54 is shown having the stop lug 57 in engagement with the stop tang 51. The mechanism is shown in the parked position in Figure 2 at which time the wiper blades 32 and 33 will be in the positions depicted by lines indicated by numerals 32' and 33'. The eccentric 54 is moved to a position where stop lug 57 engages tang 51 during reverse rotation of the motor 35, which reverse rotation effects counterclockwise movement of the worm gear 42 as shown in Figure 2. During forward rotation of the electric motor 35 which effects rotation of the worm gear 42 in the clockwise direction as viewed in Figure 2, the lug 56 on the eccentric 54 engages the other side of the tang 51. The eccentric 54 is driven from one position to the other due to frictional engagement between the crank arm 58 and the eccentric hub portion 55 of the eccentric 54. The principle function of the spring washer 59 is to prevent movement of the eccentric 54 away from the stop tang 51 due to load imposed upon the crank pin 64, although the spring washer may incidentally assist the frictional drive for varying the position of the eccentric 54 upon a change in direction of rotation of the worm gear 42.

During rotation of the worm gear 42 and shaft 45, the drive arms 62 and 62' will be rotated. Since the drive arms have driving engagement with crank pins 64 and 64', the crank arms 58 and 70 will likewise be rotated. The eccentric hub portions of eccentrics 54 and 54' are always reversed with respect to each other as shown in Figure 3. The stop lugs 56' and 57' of the eccentric 54' are engageable with a pin 69 attached to the motor end cap 36. The crank arms 58 and 70 rotate about the eccentric hubs of the eccentrics 54 and 54', and thus the orbits of the crank pins 64 and 64' have a center displaced from the center of the shaft 45, since these crank pins rotate about the center of their respective eccentrics.

With particular reference to Figures 9 and 10, during forward rotation of the motor 35, the stop lug 56 of the eccentric 54 engages the tang 51. Thus, the orbit of crank pin 64 is as depicted by the broken line indicated by numeral 68, since the center of the eccentric hub 56 is to the left of the axis of shaft 45. At this time, the stop lug 56' of the eccentric 54' engages the stop pin 69 so that the axis of rotation of the crank pin 64' is to the right of the axis of shaft 45 as viewed in Figure 3. During forward rotation, the wiper blades 32 and 33 will be moved throughout an arc depicted by angle A in Figure 1.

Upon reverse rotation of the motor 35, the eccentric 54 will be moved throughout substantially 180° to the position shown in Figure 10 wherein stop lug 57 engages the tang 51 thereby changing the orbit of the crank pin 64 to the circle indicated by broken line 71, since the center of the eccentric hub 55 has shifted from the left side of the axis of shaft 45 as seen in Figure 9 to the right side thereof as seen in Figure 10. By shifting the orbit of the crank pin 64, the effective throw of the crank is varied, although the physical length of the crank arm remains the same. During reverse rotation, the eccentric 54' likewise shifts so that the stop lug 57' engages the pin 69 so that the center of eccentric hub 55' is to the left of the axis of shaft 45, as shown in Figure 3. At this time, the amplitude of oscillation imparted to the wiper blades 32 and 33 remains the same, but the path of movement is shifted as indicated by angle B so that the blades 32 and 33 are moved into engagement with the cowl as indicated by lines 32' and 33' at the inner ends of their strokes.

When the blades arrive at the position indicated by lines 32' and 33', the motor 35 is automatically deenergized in a manner to be described. As seen in Figure 4.

the crank arm 70 has a cam portion 72 formed thereon arranged to engage a reciprocable plunger 73 mounted in the end cap 36, during reverse rotation. During forward rotation, the cam portion 72 does not engage the plunger. As seen in Figure 5, the plunger or pin 73 is engageable with an armature 75 of a relay assembly 80. The pin 73 is normally biased upwardly as seen in Figure 5, so that the inner end thereof does not engage the armature 75, by a leaf spring 74, the free end of which is situated in a groove in the inner end of the pin 73, and the other end of which is secured to the end cap 36 by a screw 76.

The relay assembly 80 includes a coil 81 which is wound about a core 82. The coil assembly is secured to a cover plate 83 of insulating material which is suitably secured to the end cap 36. The coil assembly supports a bracket 84 upon which the armature 75 is pivotally supported. The armature 75 is biased to move in a clockwise direction about the bracket 84 by a coil spring 85, one end of which is attached to the armature 75 and the other end of which is secured to the bracket 84. The armature 75 is of L-shape, as shown in Figure 5, and carries three leaf spring contact assemblies 86, 87 and 88 as shown in Figure 6. The leaf spring contact assemblies 86, 87 and 88 are insulated from each other and from the armature, and are secured to the armature 75 by rivets 89 and 90.

The movable contact assembly 86 is engageable with stationary contact 91 or stationary contact 92. The movable contact 87 is engageable with a stationary contact 93. The movable contact 88 is engageable with stationary contacts 94 or 95. Terminals 101b, 105b, 106b, 108b and 112b are also mounted on the cover 83.

Figure 7:
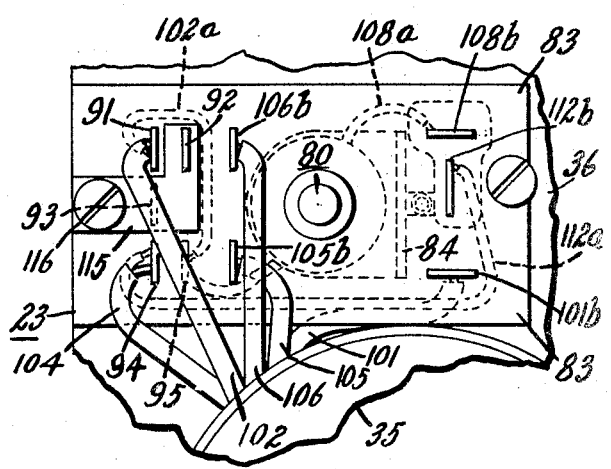
Figure 7 is a fragmentary view in elevation taken in the direction of arrow 7 of Figure 5.

With particular reference to Figures 5 through 8, the energizing circuit for the motor 35 and the relay coil 81 will be described. The circuit includes a battery 100, one terminal of which is grounded and the other terminal of which is connected by wire 101 through a thermal overload circuit breaker 120 to one end of the series field winding 38 of the motor. The wire 101 connects with terminal 101b of the reversing switch. The other end of the series field winding 38 is connected to wire 102 and to wire 103. Wire 103 connects with one end of the shunt field winding 37, and the other end of the shunt field winding is connected to wire 104. The ends of the armature 39 are electrically connected to wires 105 and 106. Wire 102 is connected to stationary contact 91 of the relay switch. Wire 102 is also connected to stationary contact 95 of the relay switch by wire 102a. In addition, the wire 102 is connected to a wire 107 connected with one end of the relay coil 81. The other end of the relay coil 81 is connected by wire 108 to a contact 109 of a manual switch through wire 108a and terminal 108b as shown in Figure 7. The manual switch includes a second stationary contact 110 and movable bridging contact 111 which is connected to ground.

The stationary contact 110 of the manual switch is connected to a wire 112 which connects with wire 104 through terminal 112b and wire 112a. The wire 104 connects with the movable contact 87 of the relay switch through wire 104a. The stationary contacts 92 and 93 of the relay switch are connected to ground. As seen in Figure 7, the contacts 92 and 93 are carried by a metal plate 115 attached to housing 36 by screw 116. Wire 104 also connects with stationary contact 94 of the relay switch. Movable contact 86 of the relay switch is connected to wire 106 through wire 106a and terminal 106b, and movable contact 88 of the relay switch is conected to wire 105 through wire 105a and terminal 105b.

When the bridging member 111 of the manual control switch is moved to the low speed position wherein it interconnects stationary contacts 109 and 110, the motor 35 is energized for low speed rotation in the forward direction. With the bridging member 111 interconnecting contacts 109 and 110, the relay coil 81 is energized from the battery 100 through series field winding 38, wire 102, wire 107, the coil 81, wire 108, contacts 109 and 111. Accordingly, the armature 75 moves in a counter-clockwise direction as viewed in Figures 5 and 8 so that movable contacts 86 and 88 engage stationary contacts 92 and 95, respectively, while movable contact 87 is out of engagement with stationary contact 93. The shunt field winding 37 is energized from wire 102 through wire 104, wire 112 and contacts 110 and 111. Current flow through the armature is from the battery 100 through series field winding 38, the wire 102, wire 102a, contact 95, contact 88, wires 105a and 105, through the armature windings to wires 106 and 106a which are connected to ground through contacts 86 and 92. At this time the stop lug 56 of the eccentric 54 will engage the tang 51 and the stop lug 56' of the eccentric 54' will engage the stop pin 69. Accordingly, the wiper blades 32 and 33 will be oscillated throughout angle A as viewed in Figure 1 at a low speed, and the cam portion 72 on the crank arm 70 will not engage pin 73.

When the bridging member 111 is moved to the high speed position, the shunt field winding 37 is deenergized while the series field winding 38, the armature and the relay coil 81 remain energized. The motor 35 now operates at high speed and the wiper blades 32 and 33 are oscillated throughout angle A as viewed in Figure 1 at high speed.

Figure 8:
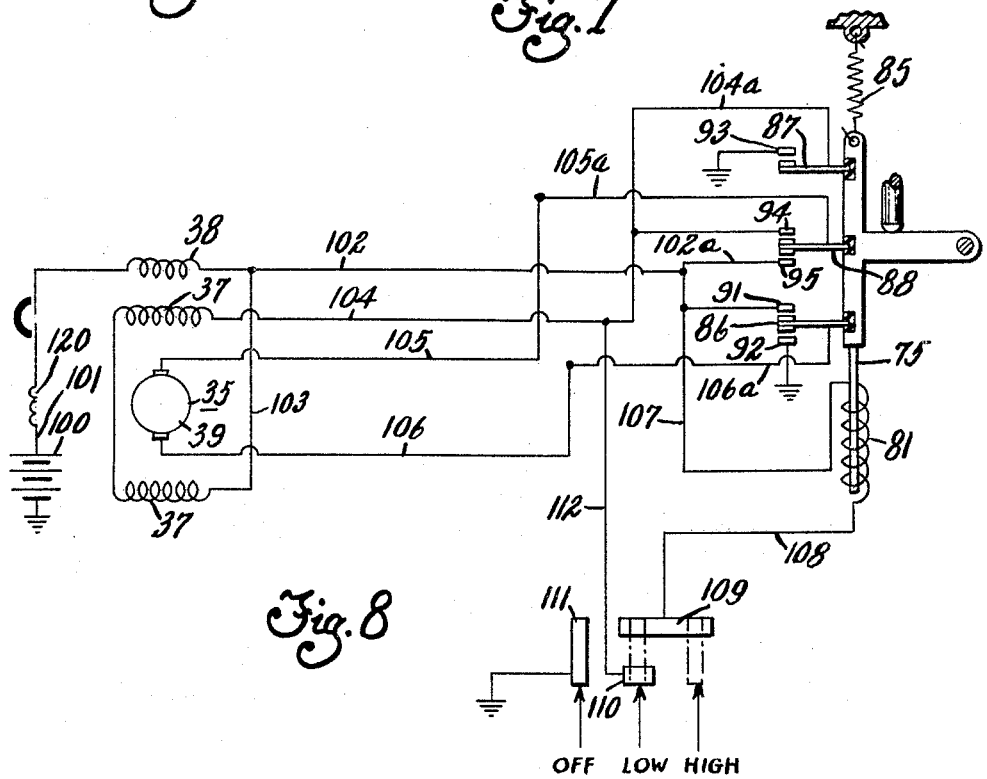
Figure 8 is a schematic wiring diagram of the windshield wiper control system.

When the bridging member 111 is moved to the "off" position as shown in full lines in Figure 8, the relay coil 81 is deenergized. Accordingly, the spring 85 moves the armature 75 in clockwise direction as viewed in Figures 5 and 8 so that movable contacts 86, 88 and 87 engage stationary contacts 91, 94 and 93 respectively. At this time the series field winding 38 is energized from the battery through wire 102, contact 91, contact 86, wires 106 and 106a, the armature 39, wires 105 and 105a, contact 88, contact 94, wire 104, wire 104a, contact 87 and contact 93. Thus, the current flow through the armature 39 is reversed so as to reverse the direction of rotation of the motor 35. The shunt field winding 37 is energized from wire 102 through wire 103, the winding 37, wire 104, wire 104a, contact 87 and contact 93. Thus, the motor is energized for slow rotation in the reverse direction and when the crank arm 70 arrives at the position depicted in Figure 4, the cam surface 72 will move the plunger 73 upwardly as viewed in Figure 4, or downwardly as viewed in Figure 5 to move the armature 75 to an intermediate position wherein the movable contacts 86, 87 and 88 do not engage any of the stationary contacts. Accordingly, the motor will be deenergized with the wiper blades at the parked position as indicated by lines 32' and 33'.

From the foregoing it is apparent that the present invention provides a unique crank assembly having a variable effective throw dependent upon the direction of rotation of a driving member. In addition, the mechanism is designed to be controlled by a simple manually operable switch which controls the energization of a relay operated reversing switch. In addition, when the direction of motor rotation is reversed upon deenergization of the relay, the cam means on one of the crank arms will automatically move the reversing switch to an "off" position to deenergize the motor with the wiper blades at the parked position.

While the embodiment of the invention as herein disclosed constitutes a preferred form, it is to be understood that other forms might be adopted, as may come within the scope of the claims which follow.

What is claimed is as follows:

1. A crank assembly for windshield wiper actuating mechanism including, a rotary shaft, an eccentric rotatably journalled on said shaft, a crank rotatably journalled on said eccentric, a drive arm having its inner end connected with said shaft and frictionally engaging said eccentric to establish a driving connection therebetween, means connecting the outer end of said drive arm and said crank for imparting rotation to said crank, a spring washer positioned between said crank and said eccentric for preventing movement of said eccentric due to loading of said crank, and means for controlling the driving connection between the drive arm and the eccentric so as to vary the effective throw of said crank.

2. A crank assembly for windshield wiper actuating mechanism including, a rotary shaft, an eccentric rotatably journalled on said shaft having a pair of spaced abutments thereon, stationary stop means cooperable with said abutments, a crank arm rotatably journalled on said eccentric, a drive arm having its inner end connected to said shaft and frictionally engaging said eccentric to establish a driving connection therebetween, a pin and slot connection between the outer end of said drive arm and said crank for imparting rotation to said crank, and means for controlling the frictional driving connection between said drive arm and said eccentric whereby when one of said abutments engages said stationary stop means, the effective throw of said crank is greater than when the other of said abutments engages said stop means.

3. Windshield wiper actuating mechanism including, a reversible rotary driving member, an eccentric rotatably journalled on the driving member, a crank rotatably journalled on the eccentric, means operatively connecting said crank and said driving member for imparting rotation to said crank, and means establishing a frictional driving connection between said eccentric and said driving member for rotating said eccentric relative to said driving member upon reversal of rotation of said driving member whereby the effective throw of said crank is dependent upon the direction of rotation of the driving member.

4. Windshield wiper actuating mechanism including, a reversible rotary driving member, an eccentric rotatably journalled on said driving member, a crank rotatably journalled on the eccentric, a drive arm having its inner end connected to said driving member, the outer end of said drive arm having a pin and slot connection with said crank for imparting rotation thereto, and means establishing a frictional driving connection between said eccentric and said drive arm to rotate said eccentric between predetermined positions upon reversal of said driving member whereby the effective throw of said crank is dependent upon the direction of rotation of the driving member.

5. Windshield wiper actuating mechanism including, a reversible rotary driving member, an eccentric rotatably journalled on said drive member having a pair of spaced abutments, stationary stop means cooperable with said abutments, a crank rotatably journalled on said eccentric, means operatively interconnecting said driving member and said crank for imparting rotation thereto, and means including a friction drive between said driving member and said eccentric so that during forward rotation of said driving member one of said abutments engages said stop means and during reverse rotation of said driving member the other of said abutments engages said stop means whereby the effective throw of said crank is dependent upon the direction of rotation of said driving member.

6. Windshield wiper actuating mechanism including, a reversible rotary driving member, an eccentric rotatably journalled on said driving member having a pair of spaced abutments, a crank rotatably journalled on said eccentric, a crank pin carried by said crank, a drive arm having its inner end connected to said driving member and having a slot in its outer end receiving said crank pin for imparting rotation to said crank, stationary stop means cooperable with the abutments on said eccentric, and means establishing a frictional driving connection between said drive arm and said eccentric so that during forward rotation of said driving member one of said abutments engages said stop means and during reverse rotation of said driving member the other of said abutments engages said stop means whereby the orbit of said crank pin with respect to the axis of said driving member is dependent upon the direction of rotation of said driving member.

7. Windshield wiper actuating mechanism including, a housing, a reversible rotary driving member journalled on said driving member having a pair of spaced abutments, stationary stop means on said housing cooperable with said abutments, a crank rotatably journalled on said eccentric, a crank pin carried by said crank, a drive arm having its inner end connected to said driving member and having a slot in its outer end receiving said crank pin for imparting rotation to said crank, and means establishing a frictional driving connection between said drive arm and said eccentric so that during forward rotation of said driving member one of said abutments engages said stop means and during reverse rotation of said driving member the other of said abutments engages said stop means whereby the orbital path of said crank pin with respect to the axis of the driving member is dependent upon the direction of rotation of said driving member.

References Cited in the file of this patent

UNITED STATES PATENTS

| | | |
|---|---|---|
| 2,173,447 | Horton | Sept. 19, 1939 |
| 2,459,906 | Weber | Jan. 25, 1949 |
| 2,491,697 | Vischulis | Dec. 20, 1949 |
| 2,494,486 | Peterson | Jan. 10, 1950 |
| 2,775,900 | Vischulis | Jan. 1, 1957 |
| 2,795,145 | McClelland | June 11, 1957 |